Jan. 10, 1967 F. E. KENDALL ETAL 3,297,439

SIMULTANEOUS SINTER BOND AND NITRIDE FOR POWDERED MATERIAL AND BACKING ASSEMBLY

Filed Nov. 18, 1963

FRED E. KENDALL
&
JACOB NITZ
INVENTORS

BY Richard MacCutcheon
ATTORNEY

United States Patent Office 3,297,439

Patented Jan. 10, 1967

3,297,439

SIMULTANEOUS SINTER BOND AND NITRIDE FOR POWDERED MATERIAL AND BACKING ASSEMBLY

Fred E. Kendall, Cleveland, and Jacob Nitz, Solon, Ohio, assignors, by mesne assignments, to Abex Corporation, a corporation of Delaware Filed Nov. 18, 1963, Ser. No. 324,303
3 Claims. (Cl. 75—208)

Figure 1:
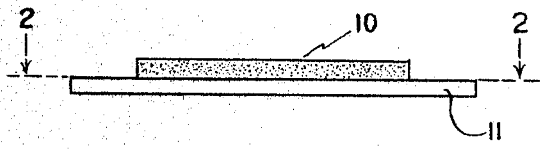

This invention relates to a novel article and method for bonding a powdered ingredient compact, e.g., predominantly metallic, to a metal support member.

In the bonding of compacts of powdered materials to support members of metal, a problem has heretofore existed because the heat, the very thing that serves to sinter (thus strengthen) the compact and to bond it to the metal, serves to soften and weaken the metal due to annealing it. In some cases, for example when the support member must itself stand wear and/or impact, the structural strength balance then becomes insufficient to resist wear or cracking of support member unless resort is had to expensive and time consuming subsequent processing following the bonding step.

The role of powder metallurgy in the production of sintered facing materials is old and well known. Generally the process consists of (1) preparing a mix containing predetermined amounts of metallic and non-metallic powders; (2) compressing the powdered mixture to form a compact; (3) selecting a metal support member; (4) cleaning the support member; (5) copper plating the support member; and (6) bonding compact to support member while simultaneously heating the compact at the sintering temperature of the predominant metallic powder which is thereby formed into a porous matrix or network throughout which other ingredients are disposed.

Conventionally the heat and pressure of the sintering step is used both to cause the pressed powder to sinter and to integrally bond it to a plated support member. This heat treats the support, undesirably in many recent instances, and according to recent prior art successive steps have included (7) stripping, grinding, etching or otherwise removing the copper plating wherever exposed (that is, not covered by the sintered compact), a difficult step particularly since it is desired to remove all such copper without oxidizing the support member, (8) further heat treating, and (9) case hardening the exposed metal surface. Sometimes step 7 (hence a satisfactory step 9) seems to be impractical, as when the shape of support member combined with accidental coating of exposed copper plating by films of lead (or other low melting point metals originally contained within the compact) occurs to an extent that the copper plating can not be satisfactorily removed.

It is an object of the present invention to simplify the procedures outlined above.

Another object is to improve characteristics of a sintered powdered material compact and support member assembly.

A further object is to provide a bonding process which will provide a more efficient and satisfactory union of powdered material, in sintered form, and a structural metal support member and without weakening the latter.

A still further object is to strengthen wear surfaces of a support member simultaneously with (1) sintering another member, and (2) bonding the two together.

In accordance with one aspect of the present invention an improved compact, a superior bond, and harder wearing surfaces on structural support member are achieved and the number of process steps are greatly minimized by (4) cleaning support member of all oil, scale and other contaminants, (5) placing unplated support member in an ammonia atmosphere with an unsintered material compact thereabove and/or therebelow and where the assembly is subjected to pressure and elevated temperature while surrounded by such ammonia atmosphere. Such a process eliminates multitudinous prior art steps of copper plating; stripping the exposed copper plate after sinter bonding, and further heat treating or case hardening support member wear surfaces to overcome the effect of annealing during the sinter bonding step, and it has the further advantage of providing a differential nitriding of the metal support member affording a desirable relatively soft and tough center and relatively hard outer surfaces, and because dissociated ammonia not only releases nascent nitrogen but nascent hydrogen as well, providing improved compact strength and a bond equal or superor to that heretofore.

Figure 2:
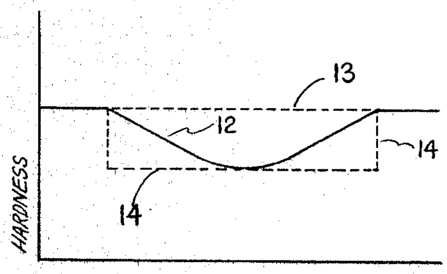

Other objects and advantages will become apparent and the invention may be better understood from consideration of the following description taken in connection with accompanying drawing in which:

FIG. 1 is a side elevational view of a finished article made according to the invention, and FIG. 2 is a graph showing hardness along the line 2—2 of FIG. 1.

In FIG. 1 a powdered material compact 10 is assumed sinter-bonded to, with simultaneous nitriding of, an originally nitridable metal 11 which serves as a structural part.

Referring to FIG. 2, the curve 12 indicates hardness (i.e., nitriding effect) on the surface of the metal support 11 along the line 2—2 of FIG. 1, which line includes the interface between compact and support member. As seen by the curve 12, in the final article according to the invention hardness varies from maximal at points on support member surface away from the compact to minimal at a position on support member intermediate the dimensional limits of the bond of compact and support. By contrast, were the support member to be nitrided separately (before assembly with compact), the hardness characteristic would follow the dash line 13 and bonding would be very difficult and expensive because of the nitrided "white layer" which would have to be first removed. By contrast also, were the support member exposed surfaces to be nitrided as a separate step (after sinter bonding) the hardness characteristics would more nearly approximate the dash line 14 in FIG. 2, although a really efficient case hardening might be very difficult as well as expensive to achieve, as explained elsewhere in this specification.

*Process steps*

(1) As in the prior art, one step in practicing the method of the present invention is formulating the compact mix. By way of example, often copper is used as the predominant metallic powder, it has been customary to then include other metals such as tin, lead, and iron as well as non-metallic powders such as silica and graphite. Typical in this respect is a mixture of 79 Cu, 7 Sn, 1 Pb, 1 $SiO_2$ and 12 graphite, all by weight As a practical matter it is impossible to set percentage ranges for any such composition, because this depends upon nature, particle size, density and shape of the ingredients, pressures and temperatures during compounding, ultimate application of the end product, and many other factors. Additionally a substitution might be made for any one of the specific components, and still the process of the present invention would be useful.

(2) The powders are well mixed and briquetted in a press, e.g., at a pressure of 11.5 tons per sq. inch.

(3) In practicing the present invention, the metal support material is carefully selected, for example as a nitridable steel (i.e., with minor amounts of hard nitride forming metal or metals), such as steels in the SAE 4000 series, or 8000 series, nitralloy, and the like.

(4) In the practice of the present invention, another step consists of mechanically and/or chemically cleaning the surface of the (e.g. nitridable steel) support member by grinding, machining, pickling, or a combination thereof. According to the prior art, the support member is next copper plated but we have found that this step is unnecessary.

(5) As the next step the compact and support member may be assembled and simultaneously sinter bonded and nitrided in a proper atmosphere. According to the prior art an inert atmosphere such as that provided by natural gas has been used for sintering but according to the present invention a reducing and case hardening atmosphere prevails during this step. With elimination of the advantage of nitriding this might be provided by carbon monoxide, but we prefer a nitrogenous atmosphere, for example, ammonia. Were CO to be used, the carburizing type of case hardening could occur only upon reaching a higher temperature.

For the preferred proceeding of nitriding, and for the specific powdered material formulation already disclosed, a temperature of 930–1050° F. is operable and is preferably reached in a furnace having a circulated ammonia atmosphere, and then a soak, e.g., of 18 hours, is used (depending on depth of nitrided layer desired) while the work material is under a usual pressure, e.g., of 200 lbs. per sq. in.

There is thus provided a process and an improved article of the class described meeting the objects above set forth. It is our belief that when the process of the invention is performed molecular diffusion commences at a lower temperature than nitriding and, as a result, the molecular bond is cemented prior to nitriding. At any rate, with the process of the invention a good bond exists between support and compact, as well as the advantages of a better network of metallic matrices (and consequent higher transverse rupture strength) in the originally powdered material, there is the elimination of prior art steps of plating and stripping, and after sinter-bonding subsequent heat treatment and subsequent case hardening, and there are all the advantages of hard wear and abrasion resistant, impact withstanding exposed surfaces on the support, which might be in the form of driving, driven or normally held stationary grooves, lugs, gear teeth or notches, or circumferential bearing surfaces.

While we do not mean to preclude the use of other materials, the supporting member will usually be of steel and the iron thereof, as is known, acts as a catalyst causing the dissociation of the ammonia gas at the elevated temperature. The nascent nitrogen thus released nitrides the steel much faster than would ordinary molecular nitrogen (as is known), but, additionally, nascent hydrogen is liberated as a more active agent for reducing oxides in the compact and in the support member at the interface, than would be the case if ordinary molecular hydrogen gas were to be used.

But whatever the reason, the process, and the article produced thereby according to the invention, results in a stronger compact, a good (and less expensive) bond, and a finished support member exhibiting differential case hardening, e.g., desirable differences in nitriding with greater degree of nitriding at support member wear surfaces and at exposed portions of the bond while more central portions remain relatively unnitrided and tougher both at support interior and, along the interface, midway between the dimensional limits of the powdered material compact, as is advantageous; because as efficient a bond would be very difficult and expensive to achieve had the FIG. 2 dash line 13 been followed instead, and as efficient a bond and as good a compact and as efficient a case hardening of exposed surfaces would have been difficult, expensive or impractical to achieve had the final article hardness followed the FIG. 2 dash line 14.

While we have illustrated and described a specific embodiment, various modifications may obviously be made without departing from the true spirit and scope of the invention. For example other hydro or nitrogenous material might be used instead of ammonia, or other case hardening methods might be used instead of nitriding. The compact might be predominantly a sinterable (e.g., at nitriding temperature) alloy or predominantly of zinc rather than copper, although copper is preferred.

The support member might be predominantly beryllium instead of steel and the catalyst (for example, causing, with application of heat, the break-up of ammonia) might be nickel instead of the iron content of steel, and it is intended that the invention is to be defined only by the appended claims taken with all reasonable equivalents.

We claim:

1. Method of bonding a compact of powdered predominantly metallic material to a metal support member, which method comprises the steps of placing support member with compact adjacent thereto both in a case hardening environment, and heating the assembly of compact and support member while said assembly is in said case hardening environment.

2. Method of bonding a compact of powdered predominantly metallic material to a metal support member, which method comprises the steps of cleaning the support member, placing the support member with said compact adjacent thereto both in a case hardening atmosphere, and subjecting the assembly of compact and support member to heat and pressure while in said case hardening atmosphere whereby the case hardening of support member ultimately varies differentially from maximum at uncovered surfaces thereof to minimum at a position intermediate limits of the interface between support member and compact.

3. The method of claim 2 further characterized by the metal support member being a nitridable alloy of steel, and the atmosphere being ammonia gas.

References Cited by the Examiner

UNITED STATES PATENTS

| | | | |
|---|---|---|---|
| 2,279,003 | 4/1942 | Matush | 75—224 X |
| 2,408,430 | 10/1946 | Lowey et al. | 75—224 X |
| 2,737,456 | 3/1956 | Haller | 75—200 |
| 2,741,828 | 4/1956 | Matthew et al. | 29—191.2 |
| 2,746,134 | 5/1956 | Drummond | 29—191.2 |
| 2,757,108 | 7/1956 | Caterson | 75—224 X |
| 2,872,311 | 2/1959 | Marshall et al. | 75—200 |
| 2,933,386 | 4/1960 | Pessel | 75—224 |

CARL D. QUARFORTH, *Primary Examiner.*

HYLAND BIZOT, BENJAMIN R. PADGETT, *Examiners.*

R. O. DEAN, M. J. SCOLNICK, *Assistant Examiners.*